United States Patent
Hinterberger et al.

(10) Patent No.: US 10,782,585 B2
(45) Date of Patent: Sep. 22, 2020

(54) METHOD FOR DETERMINING A TEMPERATURE OF A VARIABLE-TRANSPARENCY, SWITCHABLE PANE AND CONTROL APPARATUS FOR THE PANE AND MOTOR VEHICLE

(71) Applicant: Continental Automotive GmbH, Hannover (DE)

(72) Inventors: Rene Hinterberger, Vienna (AT); Peter Gubesch, Vienna (AT); Tobias Frischmuth, Vienna (AT); Johannes Greil, Vienna (AT)

(73) Assignee: Continental Automotive GmbH, Hannover (DE)

( * ) Notice: Subject to any disclaimer, the term of this patent is extended or adjusted under 35 U.S.C. 154(b) by 125 days.

(21) Appl. No.: 16/051,894

(22) Filed: Aug. 1, 2018

(65) Prior Publication Data

US 2019/0041714 A1    Feb. 7, 2019

(30) Foreign Application Priority Data

Aug. 1, 2017    (DE) .......................... 10 2017 213 302

(51) Int. Cl.
*G02F 1/163*    (2006.01)
*B60J 3/04*    (2006.01)
(Continued)

(52) U.S. Cl.
CPC ................ *G02F 1/163* (2013.01); *B60J 3/04* (2013.01); *G01K 7/16* (2013.01); *G01K 7/183* (2013.01);
(Continued)

(58) Field of Classification Search
CPC .......... G02F 1/163; G02F 1/1334; B60J 3/04; G01K 7/16; G01K 7/183; G01K 7/343; G01K 2217/00
(Continued)

(56) References Cited

U.S. PATENT DOCUMENTS 7,133,181 B2    11/2006    Greer

FOREIGN PATENT DOCUMENTS

DE    102006042538 A1    3/2008
DE    102010048097 A1    4/2012
(Continued)

OTHER PUBLICATIONS

Office Action dated Mar. 9, 2018 from corresponding German Patent Application No. 10 2017 213 302.3.

*Primary Examiner* — Collin X Beatty

(57) ABSTRACT

The disclosure relates to a method for determining a temperature of a variable-transparency, switchable pane, which has a variable-transparency layer, which is arranged to switch said pane between two transparent electrically conductive contact layers, wherein, in the method, a control apparatus of the switchable pane applies an electrical voltage to at least one of the two contact layers and determines an electric current resulting in each case from the voltage. In this case, depending on the applied voltage and the current resulting in each case, a respective ohmic resistance value and/or a combination of electrical capacitance value and ohmic resistance value of the variable-transparency layer is determined and at least one temperature value is determined therefrom by a predetermined allocation rule.

9 Claims, 3 Drawing Sheets

(51) Int. Cl.
  *G01K 7/16*   (2006.01)
  *G01K 7/18*   (2006.01)
  *G01K 7/34*   (2006.01)
  *G02F 1/1334*  (2006.01)

(52) U.S. Cl.
  CPC ......... *G01K 7/343* (2013.01); *G01K 2217/00* (2013.01); *G02F 1/1334* (2013.01)

(58) Field of Classification Search
  USPC ........................................................ 359/275
  See application file for complete search history.

(56) References Cited

FOREIGN PATENT DOCUMENTS

| | | | | |
|---|---|---|---|---|
| DE | 102012220005 A1 | 6/2013 | | |
| WO | WO-9728484 A1 * | 8/1997 | ............. | G02F 1/163 |
| WO | 98/37453 A1 | 8/1998 | | |

* cited by examiner

METHOD FOR DETERMINING A TEMPERATURE OF A VARIABLE-TRANSPARENCY, SWITCHABLE PANE AND CONTROL APPARATUS FOR THE PANE AND MOTOR VEHICLE

BRIEF DESCRIPTION OF THE DRAWINGS

Exemplary embodiments of the disclosure are described below. In this regard, in the figures.

DETAILED DESCRIPTION

Figure 1:
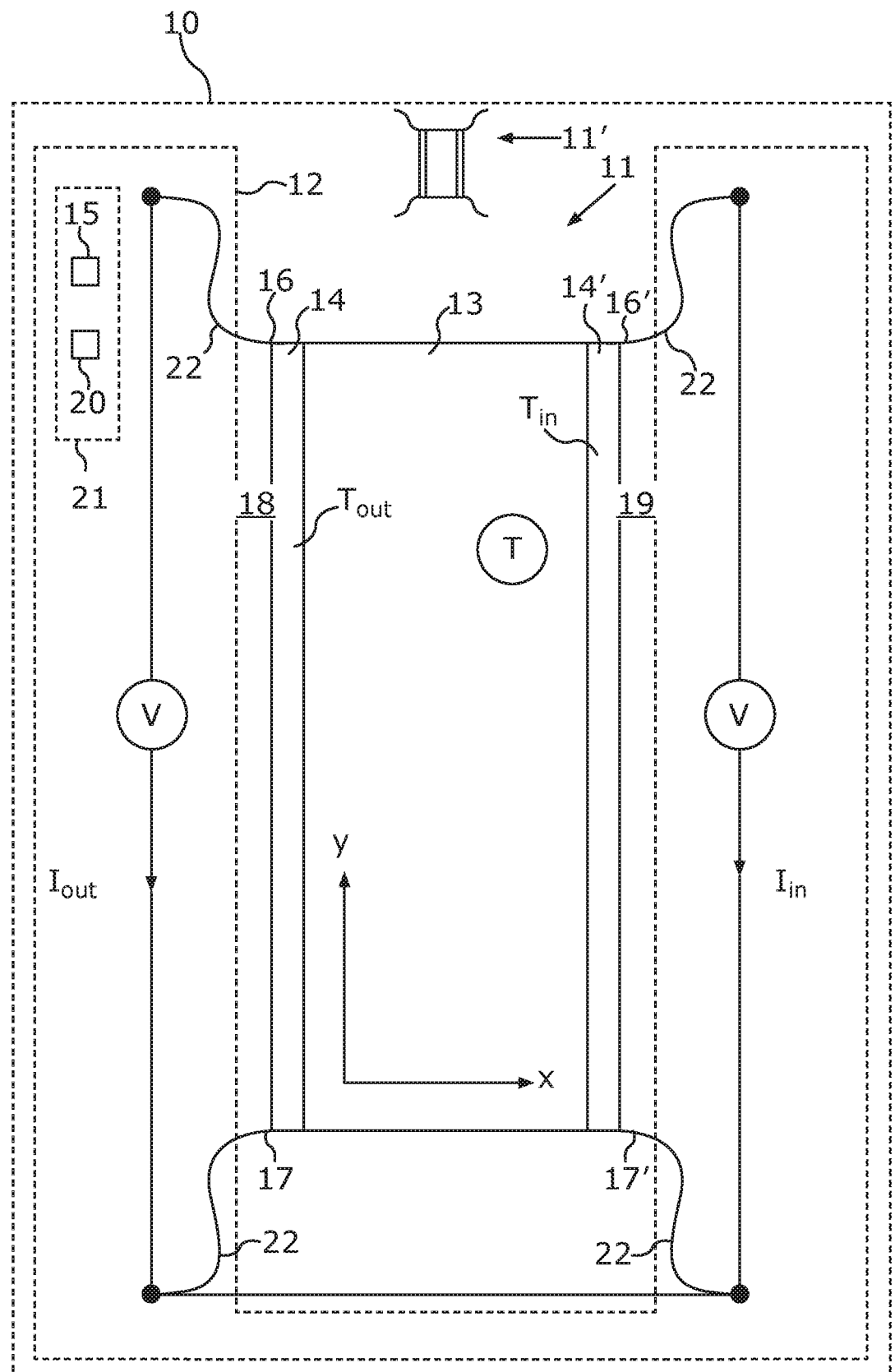
FIG. 1 shows a schematic illustration of an embodiment of a motor vehicle according to the disclosure.

The disclosure relates to a method for determining a temperature of a variable-transparency, switchable pane. A "switchable pane" of this kind is a windowpane or a glass panel, which has a variable-transparency layer, which can be switched by two electrically conductive contact layers in order to set its degree of transmittance (or e.g. transparency) or light transmissivity. The disclosure also includes a control apparatus for carrying out the method and a motor vehicle having at least one variable-transparency, switchable pane.

An example of a variable-transparency layer is an electrochromic layer. A switchable pane or switchable glazing can be designed on this basis, for example, as an SPD (Suspended Particle Device) or as a PDLC (Polymer Dispersed Liquid Crystal Device) as variable-transparency layer. Another name for a pane of this kind is also "smart glass". However, the electrical properties of a switchable pane or glazing are dependent on temperature, which makes it necessary to know the ambient temperature or better still the temperature of the glazing or pane itself for a reproducible switching response. A control signal for switching the pane can then be adjusted with the temperature as a result thereof. It is thus possible for the adapted actuation to compensate for temperature effects and/or for pane heating to be controlled in a targeted manner based on the known ambient temperature or pane temperature.

In an assembly composed of a plurality of switchable panes, insolation, a different electrical load or other influencing factors can lead to different pane temperatures of the individual panes. An assembly of this kind can be produced, for example, in a motor vehicle by using switchable panes at different locations in the motor vehicle. A building facade having a plurality of switchable panes also constitutes an assembly of this kind. In order to determine the external temperature or the pane temperature, temperature sensors are generally required. In an assembly, at least one temperature sensor would then be required for each switchable pane in order to know the different temperatures of the individual panes. However, this solution of implementing a plurality of independent temperature sensors in switchable panes is associated with a high level of outlay in terms of cabling and costs.

U.S. Pat. No. 7,133,181 B2 discloses determining a temperature of a variable-transparency, switchable pane by virtue of detecting the electrical capacitance thereof, which results from the combination of the variable-transparency layer and the two electrically conductive contact layers enclosing the variable-transparency layer. Said electrical capacitance is likewise dependent on temperature, with the result that the temperature of the pane can be inferred by measuring the capacitance. In the known method, however, for the purpose of determining a temperature value, a plurality of measurements at different boundary conditions are required in order to determine a differential value.

The subject matter of the disclosure is based on the object of making it possible to determine the temperature of a variable-transparency, switchable pane in a simple manner.

The disclosure provides a method for determining a temperature of a variable-transparency, switchable pane. The variable-transparency, switchable pane can be designed in a manner known per se, that is to say it has a variable-transparency layer, which is arranged between two transparent, electrically conductive contact layers, by way of which the variable-transparency layer can be switched, that is to say the degree of transmittance or transmittivity thereof can be set. The two contact layers constitute contact electrodes or electrodes for short in order to be able to apply an electrical voltage over the variable-transparency layer. The switchable pane can be an SPD or a PDLC, as has already been described at the beginning. Each contact layer can be formed, for example, on the basis of indium tin oxide (ITO).

In order to determine the temperature, in the method, a control apparatus applies an electrical voltage to at least one of the two contact layers. In addition, an electric current in the respective contact layer resulting in each case from the voltage is determined.

To determine the pane temperature, proceeding from these method steps, depending on the respectively applied voltage and the current resulting in each case, a respective ohmic resistance value of the respective contact layer is now determined and at least one temperature value is determined therefrom by a predetermined allocation rule. The temperature dependency of the ohmic resistors is thus used. In addition or as an alternative to an ohmic resistance value of the respective contact layer, a combination of electrical capacitance value and ohmic resistance value of the variable-transparency layer can be determined and at least one temperature value can be determined therefrom by the allocation rule.

The subject matter of the disclosure provides the advantage that a temperature value that characterizes the temperature of the switchable pane can be determined using a single measurement without changing the boundary conditions. Said temperature value can then be taken into account in the actuation of the pane. The disclosure also includes developments that provide additional advantages.

The electrical voltage can be applied between the two contact layers, with the result that the electrical field extends through the variable-transparency layer. The capacitance of the layer arrangement composed of contact layers and variable-transparency layer can then be measured. In contrast, another development makes provision for the electrical voltage to be applied within the respective contact layers, that is to say the voltage is applied in each case independently of the other contact layer within one of the contact layers individually between a first connection region of the contact layer and a second connection region of the contact layer. This can be effected for one or both contact layers. The electric current caused by the electrical voltage flows here in each case only within the contact layer between its first connection region and its second connection region. The resulting current is dependent on the ohmic layer resistance of the respective contact layer. The layer resistance, in turn, is dependent on temperature. A respective temperature value can thus be determined individually for each contact layer.

The respective temperature value is determined in this case depending on the respective ohmic layer resistance of the contact layer, that is to say the ratio of the value for the electrical voltage between the first connection region and the second connection region and the value of the resulting electric current flowing between the two connection regions.

An internal temperature can thus be determined by utilizing one of the contact layers and an external temperature can thus be determined by utilizing the other contact layer. This means that the switchable pane generally delimits an interior space against an external environment, with the result that a pane surface points toward the inner space and the corresponding contact layer detects the internal temperature, while an opposite surface of the pane points toward the external environment and the corresponding contact layer detects the external temperature. The temperature of the variable-transparency layer itself can be determined, for example, as an average value of the internal temperature and the external temperature.

If the electrical voltage is applied to the two electrically conductive contact layers, one development makes provision for the same voltage to be applied to the two contact layers with the same spatial alignment. This means that the potential field within the layers is formed mirror-symmetrically with respect to the variable-transparency layer. This has the advantageous effect that the two contact layers each have the same potential at locations arranged mirror-symmetrically with respect to the variable-transparency layer, that is to say corresponding points of the contact layers have the same potential. This prevents an electric current transversely through the variable-transparency layer. In other words, the variable-transparency layer preferably remains free of current for the temperature determination. This prevents damage to the variable-transparency layer by direct currents.

According to one development, there is thus accordingly preferably provision for the applied voltage to be a DC voltage. The temperature can therefore be determined in a particularly simple manner in technical terms. However, an AC voltage can also be applied.

One development makes provision for a control signal for setting a target transmittance of the pane to be determined or generated depending on the at least one determined temperature value. In other words, a value for the target transmittance can be prescribed and the transmittance of the pane is then set to the target transmittance, wherein the control signal is temperature-compensated. If the temperature changes, the control signal is likewise adjusted, as a result of which the transmittance of the pane remains set to the target transmittance in an unchanged manner.

There is provision, in particular, for the transmittance value of the pane to be adjusted to a transmittance value of another pane by utilizing the control signal. The control, described at the beginning, of an assembly composed of a plurality of switchable panes is thus possible in such a way that the panes have the same transmittance value. This is now also possible in panes that have different temperatures.

In order to be able to heat a switchable pane to a predetermined temperature or in a predetermined temperature range, one development makes provision for a heating current to be generated in each case in one of the contact layers or in both contact layers, said heating current being independent of the respectively other contact layer. In other words, the contact layer is used as an ohmic heating element. In this case, the heating current does not have to flow through the variable-transparency layer. Instead, an electrical heating circuit is in each case closed only by utilizing one of the contact layers. A second heating circuit can then be closed by utilizing the other contact layer. As a result thereof, the variable-transparency layer of the pane can be heated, in particular using a direct current. It is thus possible to reduce, for example, the inertia or time constant of the variable-transparency layer by heating it up.

Said voltage for determining the temperature and/or the heating current for heating the panes can respectively of course also be superposed or modulated with an AC voltage, as is used for switching the pane, that is to say for setting the transmittance of said pane.

In order to carry out the method according to the disclosure, the disclosure also provides a control apparatus for at least one variable-transparency, switchable pane. The control apparatus has a computation unit, which is configured to carry out the abovementioned embodiments of the method according to the disclosure. To this end, the computation unit can have a microcontroller or a logic circuit (e.g. an ASIC—Application Specific Integrated Circuit). The method steps can be implemented as a computer program or control logic of the computation unit.

The method according to the disclosure can be used for controlling at least one variable-transparency, switchable pane that can be provided in a building. However, the disclosure preferably contemplates for controlling at least one variable-transparency pane in a motor vehicle. The subject matter of the disclosure accordingly also comprises a motor vehicle having at least one variable-transparency, switchable pane and having an embodiment of the control apparatus according to the disclosure that is coupled to the at least one pane. In the motor vehicle, the arrangement composed of a plurality of panes can thus be controlled as an assembly, wherein the transmittance values of the panes can be matched and in this case temperature compensation can be provided. The motor vehicle according to the disclosure can be designed as an automobile, for example as a passenger vehicle or truck.

In each exemplary embodiment, the described components of the embodiment each represent individual features of the disclosure which are to be considered independently of one another and which each also develop the subject matter of the disclosure independently of one another and can therefore also be considered to be a component of the subject matter of the disclosure, either individually or in a combination other than that shown. Furthermore, further features of the subject matter of the disclosure which have already been described can also be added to each described embodiment.

In the figures, functionally identical elements are in each case provided with the same reference designations.

FIG. 1 shows a motor vehicle 10, which may be an automobile, for example a passenger vehicle. Variable-transparency, switchable glazings or panes 11, 11' can be provided in the motor vehicle 10. By way of example, a pane 11, 11' may be in each case a roof pane of a vehicle roof or a windowpane of a vehicle door or a windshield or a rear window. A control apparatus 12 can be provided for the panes 11, 11', which control apparatus can set a transmittance or transmittivity of the respective pane 11, 11' in a manner known per se. To this end, each of the panes 11, 11' can have a variable-transparency layer 13, which is illustrated in cross section in FIG. 1 for the pane 11. A respective transparent, electrically conductive contact layer 14, 14', which can be formed in each case, for example, from indium tin oxide (ITO), can be arranged on both sides of a surface of the variable-transparency layer 13. An electrical AC voltage can be set in a manner known per se between the two contact layers 14, 14' for the purpose of setting the transmittance, as a result of which the transmittance of the variable-transparency layer 13 can be changed. In the deenergized state, the layer 13 may have the minimum transmittance. In the case of an electrochromic layer 13, a DC voltage can be provided instead of the AC voltage.

However, in order to set the transmittance or the transmittance value of the pane 11 to a target transmittance 15 at a specified temperature T of the pane 11, in particular the variable-transparency layer 13, the corresponding voltage signal has to be adjusted to the temperature T. The value of the target transmittance 15 can be adjusted, for example, to a present transmittance of the other pane 11' in order that the panes 11, 11' have a matching or equal transmittance. The target transmittance 15 can also be prescribed by a user by utilizing an operating device (not illustrated).

In order to compensate the voltage signal for setting the transmittance in relation to the temperature T, the temperature T of the pane 11 has to be known. The control apparatus 12 can determine the temperature T from electrical properties of the pane 11 itself.

In one variant i, the respective ohmic resistance value of each contact layer 14, 14' can be determined independently of one another or else the ohmic resistance value of only one of the contact layers 14, 14'. In other words, the layer resistance of one or both contact layers 14, 14' is thus determined. To this end, the control apparatus 12 can have an electrical circuit, which applies an electrical voltage V to the contact layers 14, 14'. In this case, the voltage V is applied in each contact layer 14, 14' individually, that is to say said voltage extends within the respective contact layer 14, 14' from a first connection region 16, 16' to a second connection region 17, 17'. The respective contact layer is electrically connected to the control apparatus 12 at the connection regions 16, 16', 17, 17'.

A coordinate system xy is illustrated in FIG. 1 for the following explanation for the purpose of better orientation.

An electrical field is generated through the layer 13, that is to say, along the x direction, for the purpose of setting the transmittance of the variable-transparency layer 13. In order to detect the temperature T, in the variant i, in contrast, the electrical field of the voltage V is generated only in the y direction within the respective layer plane of the contact layers 14, 14', with the result that said electrical field extends between the connection contacts 16, 17 of the contact layer 14 or within the contact layer 14' between the connection regions 16', 17'. An electric current resulting from the voltage V and the layer resistance of the respective contact layer 14, 14' accordingly flows only along the y direction within the respective contact layer. The variable-transparency layer 13 can remain free of current.

To this end, the control apparatus 12 preferably also actively ensures that a DC voltage is not applied over the active layer 13 in the x direction in any case. This applies, on the one hand, in order to prevent degradation of the layer 13 and, on the other hand, a precise measurement of the layer resistance of each contact layer 14, 14' individually is more precise than using a transverse current component through the layer 13. In order to prevent a current in the x direction during temperature detection, a symmetrical voltage V is preferably applied to the outer contact layer 14 and the inner contact layer 14', which voltage may be an AC voltage or a DC voltage. Symmetrical means that the resulting potential field between the connection regions 16, 16' on the one hand and 17, 17' on the other hand is formed mirror-symmetrically with respect to the active layer 13 in the contact layers 14, 14', as a result of which it is ensured that an electrical field or a potential gradient is present only in the y direction but not in the x direction.

In this case, a current Iout flows in the contact layer 14 on an outer side 18 of the pane 11 and a current Iin flows in the contact layer 14' on an inner side 19 of the pane 11. An external temperature Tout can thus be determined in the contact layer 14 arranged on the outer side 18 and an internal temperature Tin can be determined for the contact layer 14' on the inner side 19.

The control apparatus 12 can determine the respective layer resistance from the current values of the currents Iout, Iin and the respective value of the external temperature Tout and the internal temperature Tin proceeding from the layer resistance by utilizing an allocation rule 20. The allocation rule 20 may have been designed, for example, as a table or characteristic curve and, for example, may have been determined by a test series. The temperature T of the variable-transparency layer 13 can then be inferred from the external temperature Tout and the internal temperature Tin, the temperature being able to be calculated, for example, as an average value, in particular, as a weighted average value.

For the calculations, the control apparatus 12 can have, for example, a microcontroller as computation device 21.

The pane 11' can also be monitored and/or controlled by the control apparatus 12 in the same way.

A temperature sensor on each individual pane 11, 11' can thus be spared or omitted by virtue of the temperature T being determined from the electrical properties of the switchable panes 11, 11' themselves.

In this case, the described variant i uses the transparent, electrically conductive contact layers 14, 14' (for example made of ITO), which are provided anyway, in order to contact the variable-transparency active layer 13 of the switchable pane 11. Here, however, the temperature is also determined from the change in its layer resistance taking into account the temperature coefficient of the resistance or a calibration curve or generally the allocation rule 20 for the respective material of the contact layers 14, 14'. Existing contacting means 22 at the connection regions 16, 16', 17, 17' and the actuation electronics of the control apparatus 12, as are also used for setting the transmittance of the layer 13, can be used for measuring the layer resistance of each contact layer 14, 14'. Additional electrical interconnection is thus not necessary.

Two resistance values for the layer resistances of the contact layers 14, 14' can be determined independently of one another and in turn the temperature value for the external temperature Tout and the internal temperature Tin for the outer contact layer 14 and the inner contact layer 14' therefrom. The double measurement is more precise compared to the single measurement.

Figure 2:
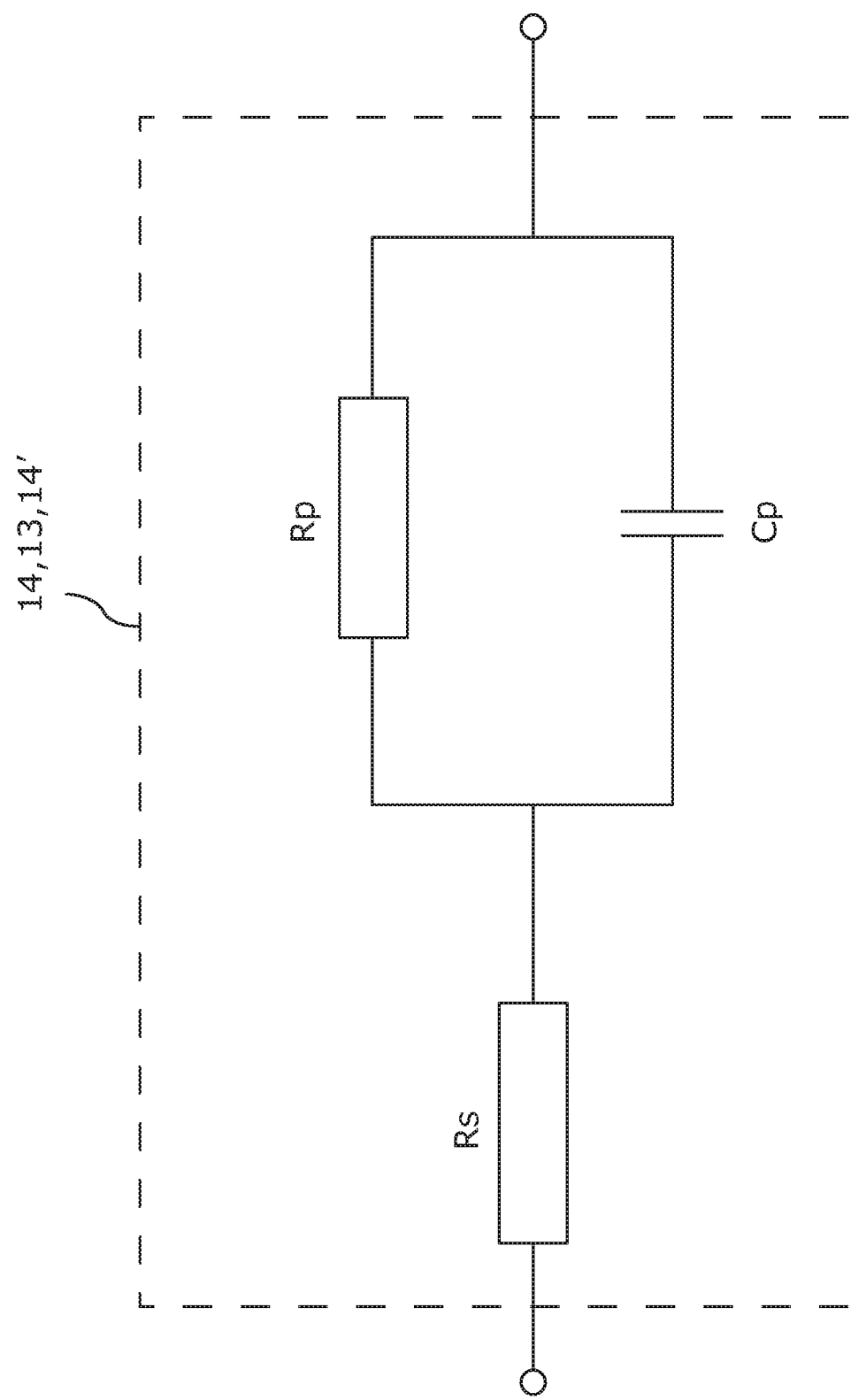
FIG. 2 shows a schematic equivalent circuit diagram of the impedance of a switchable pane or glazing.
Figure 3:
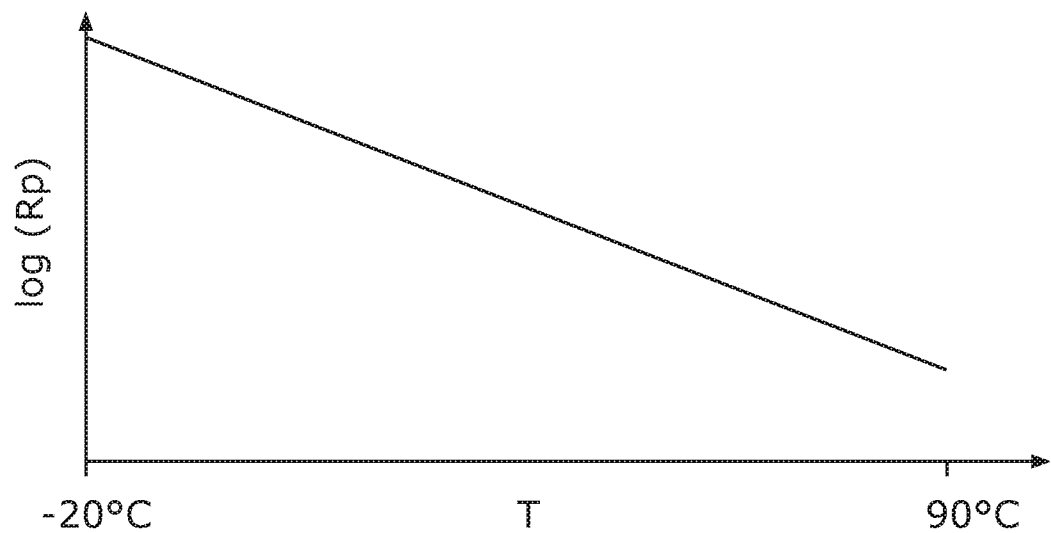
FIG. 3 shows a temperature characteristic of electrical equivalent variables of the equivalent circuit diagram of FIG. 2.
Figure 3:
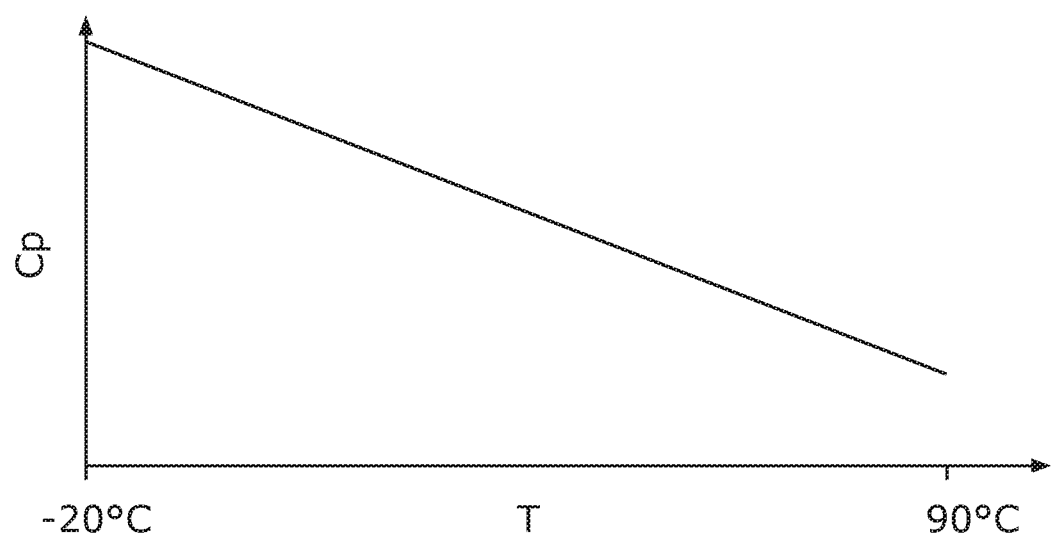

An alternative form of measurement is illustrated on the basis of FIG. 2 and FIG. 3 as variant ii. FIG. 2 shows here an equivalent circuit diagram of the impedance of the switchable pane, that is to say the layer arrangement composed of the contact layers 14, 14' and the variable-transparency layer 13 enclosed between said contact layers. An impedance measuring means can likewise be integrated in the actuation electronics of the control apparatus 12. Said impedance measuring means can determine a respective complex-value impedance of the individual panes 11, 11'.

Methods for determining impedance are given, inter alia, by measurement bridges, the measurement of the magnitude and the phase of current and voltage and the evaluation of step and pulse responses. The temperature T of the pane 11, in particular of the layer 13, can be calculated from the temperature dependency of the impedance (based on an allocation rule 20, such as a calibration curve, for example). If, for example, the equivalent circuit according to FIG. 2 is taken as a basis, the parallel resistor Rp and the capacitance Cp show monotonously falling temperature dependency, as is illustrated in FIG. 3. Rp decreases approximately exponentially with the temperature, which results in a linear decrease in the logarithmic illustration of FIG. 3. Cp falls approximately linearly. Both curves can be calibrated and the temperature T can be calculated from the values Rp and Cp as a result thereof. The series resistor Rs of the contact layers 14, 14' can in this case be removed.

The advantage of the specified solutions is the potential for saving on discrete temperature sensors, which would otherwise be necessary for each pane 11, 11'. Discrete temperature sensors incur costs and outlay for the application, cabling and interconnection. Additionally, in contrast, the control apparatus 12 delivers the temperature T of the active layer directly, whereas discrete temperature sensors measure the temperature outside or inside at the laminated layer 11, 11'.

Overall, the example shows how the subject matter of the disclosure can carry out a temperature measurement by utilizing present electrodes of a switchable glazing.

The invention claimed is:

1. A method for determining a temperature of a variable-transparency, switchable pane comprising a variable-transparency layer, the layer arranged to switch said pane between two transparent, electrically conductive contact layers, comprising: at a control apparatus of the switchable pane, applying an electrical voltage to at least one of the two contact layers and determining an electric current resulting in each case from the voltage,
wherein depending on the applied voltage and the current resulting in each case, at least one of a respective ohmic resistance value of the respective contact layer and a combination of electrical capacitance value and ohmic resistance value of the variable-transparency layer is determined and at least one temperature value is determined therefrom by a predetermined allocation rule;
wherein the electrical voltage is applied within at least one of the contact layers in each case between a first connection region of the contact layer and a second connection region of the contact layer and the current flowing in each case in a layer plane of the contact layer from the first connection region to the second connection region is determined and a respective temperature value is determined depending on the respective ohmic layer resistance of the contact layer; and
wherein an internal temperature is determined utilizing one of the contact layers and an external temperature is determined utilizing the other contact layer.

2. The method as claimed in claim 1, wherein the same voltage is applied to the two contact layers with the same spatial alignment so that the two contact layers each have the same electrical potential on both sides of the variable-transparency layer at locations arranged mirror-symmetrically with respect to the variable-transparency layer.

3. The method as claimed in claim 1, wherein the variable-transparency layer remains free of current for the temperature determination.

4. The method as claimed in claim 1, wherein the applied voltage is a DC voltage or an AC voltage.

5. The method as claimed in claim 1, wherein a control signal for setting a target transmittance of the pane is determined depending on the at least one temperature value.

6. The method as claimed in claim 5, wherein a transmittance value of the pane is adjusted to a transmittance value of another pane by the control signal.

7. The method as claimed in claim 1, wherein a heating current is generated in each case in one of the contact layers or in both contact layers, said heating current being independent of the respectively other contact layer.

8. A control apparatus for at least one variable-transparency, switchable pane, the control apparatus comprising: a computation unit configured to carry out the method as claimed in claim 1.

9. A motor vehicle comprising:
at least one variable-transparency, switchable pane, and
the control apparatus as claimed in claim 8 coupled to the at least one pane.

* * * * *